Dec. 12, 1939.　　　E. O. REYNOLDS　　　2,183,432
BRAKE MECHANISM
Filed Feb. 23, 1937　　　2 Sheets-Sheet 1

INVENTOR
EDWARD. O. REYNOLDS.
BY Whittemore Hulbert & Belknap
ATTORNEYS

Dec. 12, 1939.  E. O. REYNOLDS  2,183,432
BRAKE MECHANISM
Filed Feb. 23, 1937  2 Sheets-Sheet 2
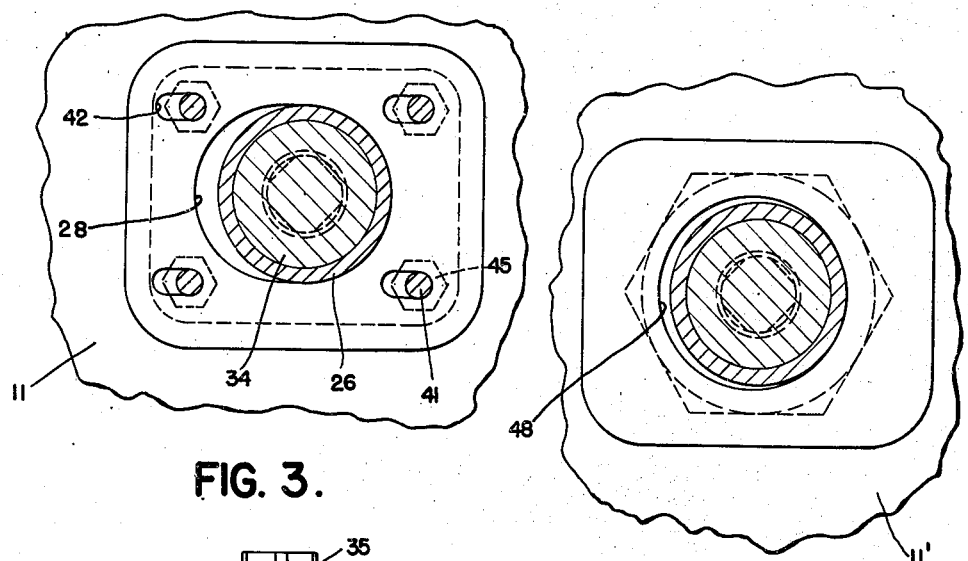
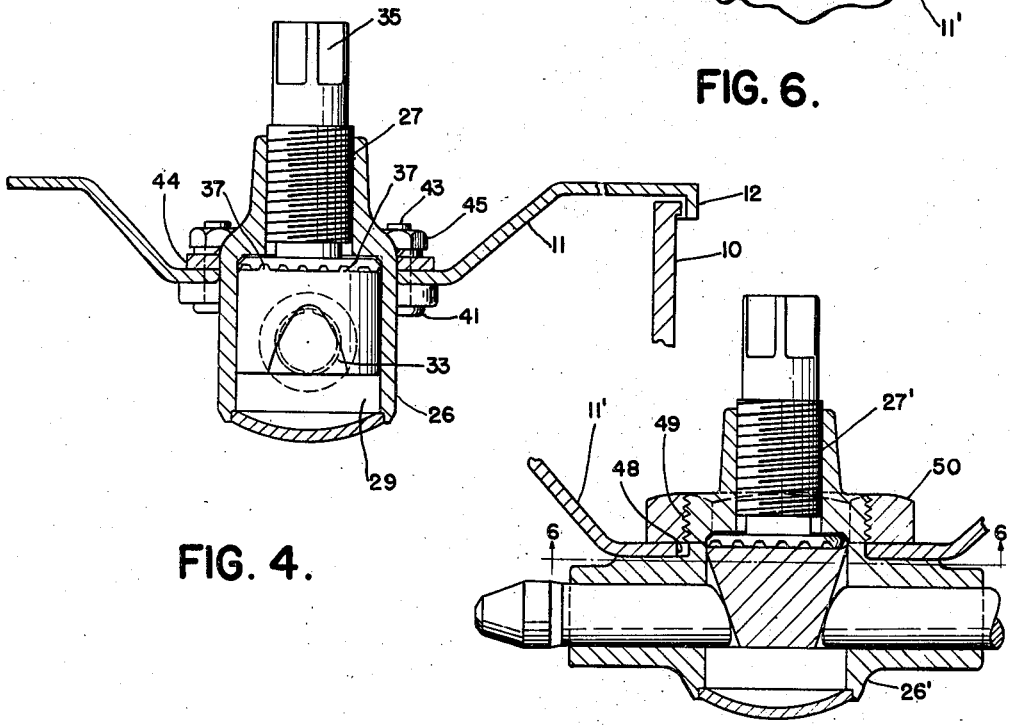
INVENTOR
EDWARD. O. REYNOLDS
BY
ATTORNEYS Patented Dec. 12, 1939

2,183,432

UNITED STATES PATENT OFFICE 2,183,432

BRAKE MECHANISM

Edward O. Reynolds, Detroit, Mich., assignor to Kelsey-Hayes Wheel Company, Detroit, Mich., a corporation of Delaware Application February 23, 1937, Serial No. 127,262

14 Claims. (Cl. 188—79.5)

This invention relates generally to brake mechanisms and refers more particularly to improvements in adjustment anchor devices for the brake friction means.

One of the principal objects of the present invention consists in the provision of an adjustment anchor device mounted on the brake carrier between the adjacent ends of the friction means for shifting movement as a unit with the friction means upon application of the brake. This is advantageous in that it renders it possible to transfer torque from the leading portion of the friction means to the trailing portion of the latter, and thereby assists in the application of the brake.

Another object of the present invention resides in the provision of a construction of the character set forth in the preceding paragraph, wherein the adustment device is not only capable of shifting movement substantially circumferentially of the brake drum as a unit with the brake friction means, but is also capable of limited movement generally radially relative to the drum. This feature is advantageous in that it affords the radial movement of the friction means required to insure effective engagement of the adjustment ends of the friction means with the braking surface throughout the application of the brake.

The foregoing, as well as other objects, will be made more apparent as this description proceeds, especially when considered in connection with the accompanying drawings, wherein:

Figure 3 is a sectional view taken substantially on the plane indicated by the line 3—3 of Figure 2;

Figure 4 is a sectional view taken substantially on the plane indicated by the line 4—4 of Figure 1;

Figure 5 is a sectional view illustrating a modified form of adjustment anchor device; and Figure 6 is a sectional view taken substantially on the plane indicated by the line 6—6 of Figure 5.

Figure 1:
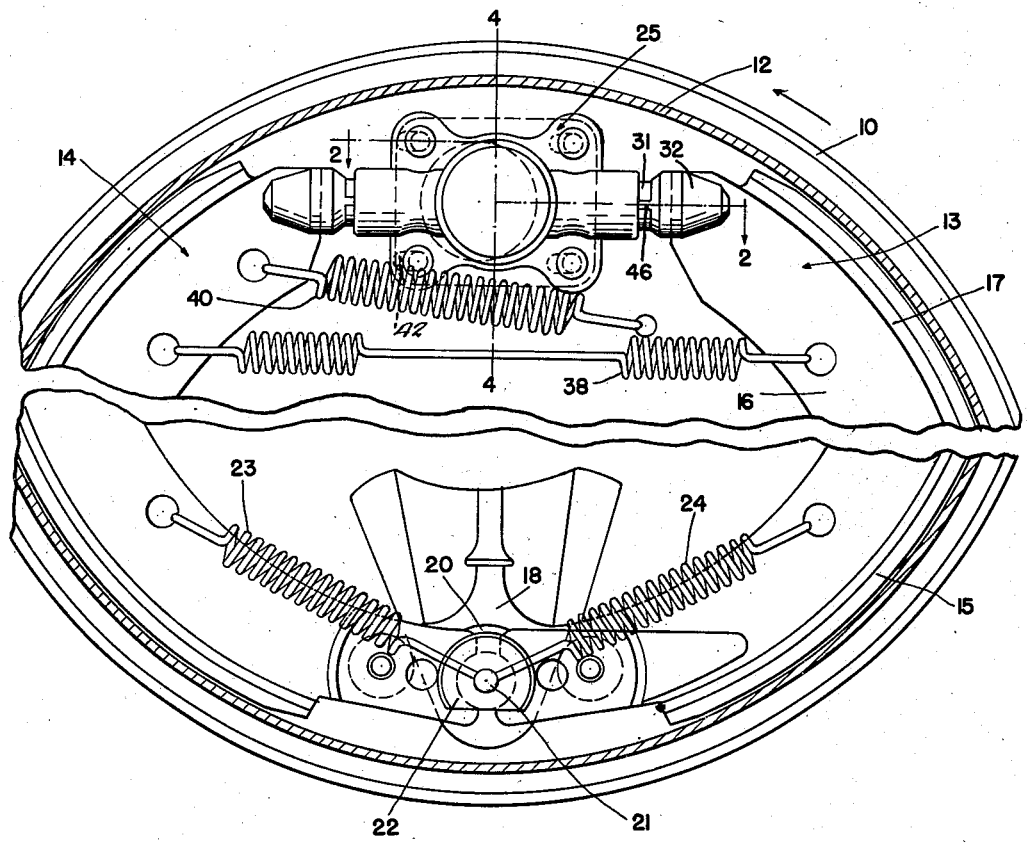
Figure 1 is a side elevational view partly in section of a brake mechanism equipped with an adjustment anchor device constructed in accordance with this invention.

The brake mechanism illustrated in Figures 1 to 4, inclusive, comprises a brake drum 10 and a brake carrier 11 in the form of a backing plate cooperating with the annular brake flange 12 on the drum to substantially close the latter. Mounted on the carrier within the brake drum is a pair of brake shoes 13 and 14 having friction linings 15 secured thereto for engagement with the inner surface of the brake flange 12 on the drum. In the present instance, the shoes are of the usual T-shaped construction having the web portions 16 disposed in a plane substantially parallel to the plane of rotation of the drum and having the head portions 17 extending axially of the drum to form a support for the friction linings 15.

The opposite ends of the shoes are spaced from each other and an actuator 18 of any suitable construction is located between the ends of the shoes at one side of the drum. Although various different types of actuators may be employed without interfering with the adjustment device forming the subject matter of this invention, nevertheless, the actuator selected must be such as to permit the shoes to move both circumferentially and radially. For the purpose of illustration, the actuator 18 is shown herein as comprising an outwardly movable wedge located between the lower ends of the shoes for movement in a plane substantially parallel to the plane of rotation of the drum and having upwardly diverging opposite side edges respectively engageable with the lower ends of the shoes. The body portion of the wedge is provided with an aperture 20 therethrough for receiving a shouldered pin 21 and the dimension of the opening is such as to permit radial, as well as circumferential shifting movement of the wedge relative to the pin. It will be observed from Figure 1 that the lower ends of the web portions 16 of the shoes are provided with extensions 22 having the adjacent ends fashioned to abut the opposite sides of the pin 21 in the released position of the brake. In accordance with the usual practice, the lower end of the trailing shoe is normally urged into engagement with the abutment by means of a spring 23 and the adjacent end of the leading shoe is normally maintained into engagement with the abutment by means of a spring 24 having a strength less than the spring 23 in order to insure engagement of the leading shoe with the brake flange upon outward movement of the wedge 19.

Figure 2:
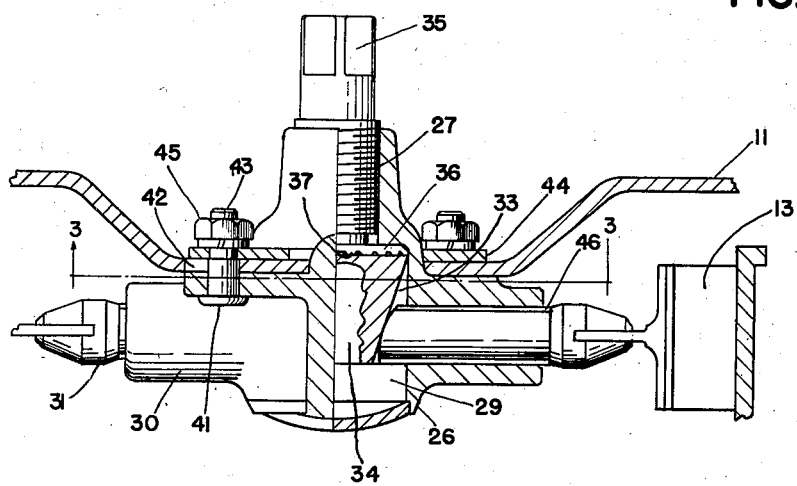
Figure 2 is a sectional view taken substantially on the plane indicated by the line 2—2 of Figure 1.

The adjustment anchor device 25 is supported upon the backing plate 11 between the upper ends of the shoes and includes a bracket 26. The bracket 26 is shown in Figure 2 as having a portion located within the drum in sliding engagement with the inner surface of the backing plate 11 and as having a reduced internally threaded portion 27 extending through an enlarged opening 28 in the backing plate. As will be more fully hereinafter set forth, the opening 28 is elongated to provide for shifting movement of the bracket with the leading shoe 13 when the brake is applied.

Upon reference to Figure 2, it will be noted that the portion of the bracket within the brake drum is formed with an axially extending recess 29 therein and is provided with aligned tubular portions 30 extending from opposite sides of the recess 29 with the axis thereof perpendicular to the axis of the recess 29. The tubular portions 30 of the bracket slidably receive suitable adjustment links 31 having heads 32 at the outer ends slotted to slidably receive the upper extremities of the web portions 16 of the shoes. The inner ends of the links 31 are inclined with respect to the axis of the recess 29 and extend into grooves 33 formed in opposite sides of the cylindrical wedge 34. The bottoms of the grooves 33 are also inclined with respect to the axis of the recess 29 and effect an outward movement of the links upon inward movement of the wedge relative to the bracket.

The wedge 34 has a sliding fit within the recess 29 and is moved inwardly by means of an adjusting screw 35 threadedly mounted in the portion 27 of the bracket and having an enlarged head 36 on the inner end thereof for abutting engagement with the outer end of the wedge 34. In the present instance, the inner face of the enlarged head and the adjacent outer end of the wedge are provided with interengaging notches and projections 37 cooperating with each other to hold the screw against accidental rotation and to indicate predetermined increments of adjustment.

With the above construction, the brake is adjusted by manipulating the screw 35 to move the wedge 34 inwardly the extent required to engage the friction linings 15 on the shoes with the inner surface of the brake flange 12. The adjustment screw 35 is then rotated in the opposite direction one or more increments, indicated by the interfitting notches and projections 37, depending upon the desired clearance between the friction linings 15 and brake flange 12. As the adjustment screw is backed off the number of increments required to secure the desired adjustment, the wedge 34 is moved outwardly to preserve its contact with the head 36 on the inner end of the screw by means of the retraction spring 38 interconnecting the adjustment ends of the shoes in such a manner as to react through the latter ends to maintain the inner ends of the adjustment links into frictional engagement with the adjustment wedge 34.

In the present instance, the brake shoes are centralized in the brake drum when the side of the bracket adjacent the adjustment end of the leading shoe 13 is in abutting engagement with the corresponding end of the slot 28, and the bracket is normally urged in this position by means of a spring 40 having one end secured to the adjustment end of the trailing shoe 14 and having the opposite end secured to the backing plate 11. With this construction, it will be noted that as the primary or leading shoe 13 is brought into engagement with the brake flange 12 by the actuator 18, the torque resulting from the servo action of this shoe is transferred through the adjustment device to the trailing shoe 14 and serves to move the latter outwardly into engagement with the brake flange. In the present instance, the amount of torque transferred from the leading to the trailing shoe is determined by the degree of frictional contact of the bracket with the backing plate. In the embodiment of the invention shown in Figures 1 to 4, inclusive, the bracket 26 is secured to the backing plate, through the medium of shouldered bolts 41, carried by the bracket and extending through elongated slots 42 in the backing plate. The reduced threaded ends of the bolts 43 extend through a plate 44 at the outer side of the backing plate and are adapted to receive the clamping nuts 45. As will be observed from Figure 3, the slots 42 are elongated in the direction of the opening 28 through the backing plate and permit shifting movement of the bracket 26 relative to the backing plate toward the trailing shoe from the center position of the bracket shown in Figure 3. It will be apparent from the above that the resistance offered to movement of the bracket relative to backing plate depends, to some extent, upon the area of the plate 44 and bracket engaging the backing plate. It follows, therefore, that the resistance to the transfer of torque from the leading shoe to the trailing shoe may be determined by varying the area of contact of the bracket and plate 44 with the backing plate to suit the co-efficient of friction of the lining used.

Attention may be called to the fact at this time that provision is made for insuring engagement of the adjustment ends of the shoes with the brake flange during brake application. This is accomplished by forming the stem portions of the adjustment links 31 of less diameter than the internal diameter of the tubular portions 30 of the bracket, and by rounding the inner ends of the links to provide for angular movement of the outer ends of the links in a plane parallel to the plane of rotation of the brake drum. This construction cooperates with the wedge actuator previously described to permit the extent of radial movement of the shoes required to insure engagement of the adjustment ends with the brake flange. The links, however, are prevented from angular movement in a plane transverse to the radial movement of the shoes by means of ribs 46 formed on diametrically opposite sides of the links and extending longitudinally of the latter.

The embodiment of the invention illustrated in Figures 5 and 6 differs from the one previously set forth in that the bolts 41 and associated parts are eliminated. As shown particularly in Figure 5, the reduced internally threaded portion 27' of the adjustment bracket 26' extends through an enlarged opening 48 in the backing plate 11' and is externally threaded, as at 49, for receiving a clamping nut 50. The clamping nut engages the outer side of the backing plate 11' and cooperates with the portion of the bracket at the inner side of this plate to frictionally hold the bracket against the backing plate. In this embodiment of the invention, the torque transferred from the leading shoe to the trailing shoe is by the area of engagement of the clamping nut and bracket with the backing plate. Also, in this construction, the anchor bracket and adjustment links are capable of limited movement generally radially of the brake drum, which is advantageous in that it insures engagement of the adjustment ends of the shoes with the brake flange during brake application irrespective of slight inaccuracies in manufacture or variations in the size of the drum caused by the application of heat. In addition, the radial movement of the entire adjustment device offers the possibility of eliminating the longitudinal ribs on the links and permits fitting the latter in the tubular portions of the brackets in the manner shown in Figure 5. In some instances, however, it may be desirable to also provide rocking movement of the adjustment links relative to the bracket and in cases of this character, the arrangement of adjustment links, shown in Figure 2, could be adopted in the construction shown in Figure 5.

What I claim as my invention is:

1. In a brake mechanism, the combination with a brake drum and a backing plate for said drum, of brake friction means supported on the backing plate in said drum for circumferential movement relative to the backing plate and having spaced ends, an adjustment device having a bracket located between said ends and having a member carried by the bracket for sliding movement in a direction parallel to the axis of the drum to adjust the ends of the friction means, and means supporting the bracket on the backing plate in frictional engagement therewith for limited movement generally radially and circumferentially of the brake drum.

2. In a brake mechanism, the combination with a brake drum and a backing plate for the drum, of brake friction means supported on the backing plate within the drum for circumferential movement relative to the backing plate and having spaced ends, an adjustment device having a supporting element located between the ends of the friction means and having a member carried by the element for sliding movement axially of the element to adjust said friction means, and means mounting the supporting element on the backing plate for movement generally radially and circumferentially of the brake drum relative to the plate as a unit with the friction means.

3. In a brake mechanism, the combination with a brake drum and a backing plate for the drum, of brake friction means supported on the backing plate within the drum for circumferential movement relative to the backing plate and having spaced ends, an adjustment device located between the ends of the friction means and having means engageable with said ends to adjust the friction means, an abutment on the backing plate engageable with said device to anchor the friction means in one direction, and means mounting the device on the backing plate permitting shifting movement of the device as a unit with the friction means in the opposite direction.

4. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a member carried by the bracket for sliding movement axially of the bracket to adjust said friction means, an abutment on the backing plate engageable with said bracket to anchor the friction means in one direction, and means mounting the bracket on the backing plate for sliding movement in frictional engagement with said plate as a unit with the friction means in the opposite direction.

5. In a brake mechanism, the combination with a brake drum and a backing plate for the drum, of brake friction means supported on the backing plate within the drum for circumferential movement relative to the backing plate and having spaced ends, an adjustment device located between the ends of the friction means and having means engageable with said ends to adjust the friction means, and means mounting the adjustment device on the backing plate for movement generally radially and circumferentially of the brake drum relative to the backing plate.

6. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a member carried by the bracket for sliding movement axially of the bracket, means also carried by the bracket and effective upon movement of said member in one direction to adjust the friction means, and means mounting the bracket on the backing plate in frictional engagement therewith for movement generally radially and circumferentially of the brake drum relative to said plate.

7. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a member carried by the bracket for sliding movement axially of the bracket, means also carried by the bracket and effective upon movement of said member in one direction to adjust the friction means, an abutment on said backing plate engageable with the bracket to anchor the friction means in one direction, and means clamping the bracket against the backing plate and permitting shifting movement of the bracket as a unit with the friction means in the opposite direction.

8. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a portion extending through an enlarged opening in the backing plate, said portion engageable with one edge of the opening to anchor the friction means in one direction, a member carried by the bracket for movement axially of the brake drum to adjust the friction means, and means mounting the bracket on the backing plate for shifting movement as a unit with the friction means in the opposite direction.

9. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a portion extending through an enlarged opening in the backing plate, one edge of the opening being predeterminedly located to engage the adjacent side of said portion in the released position of the brake, a member carried by the bracket for movement axially of the drum and operatively connected to the ends of the friction means to adjust the latter, and means mounting the bracket on the backing plate in frictional engagement therewith for circumferential shifting movement as a unit with the friction means in a direction toward the opposite edge of said opening.

10. In a brake mechanism, the combination with a brake drum and a backing plate for the drum, of brake friction means supported on the backing plate within the drum for circumferential movement relative to the backing plate and having spaced ends, an adjustment device having a bracket located between the ends of the friction means and having a portion extending through an enlarged opening in the backing plate, said portion engageable with one edge of the opening to anchor the friction means in one direction, a member carried by the bracket for movement axially of the brake drum to adjust the friction means, and means mounting the bracket on the backing plate for movement generally radially of the brake drum relative to the backing plate and for circumferential shifting movement with the friction means in a direction opposite to the one aforesaid.

11. In a brake mechanism, the combination with a brake drum and a backing plate for the drum, brake friction means supported on the backing plate within the drum for circumferential shifting movement relative to the backing plate and having spaced ends, an adjustment device having a supporting element extending between the ends of the friction means and having a portion projecting through an enlarged opening in the backing plate, said portion engageable with one edge of the opening to anchor the friction means in one direction and to center the friction means within the brake drum in the released position of said friction means, a member carried by the supporting element for movement axially of the brake drum to adjust the friction means, and means mounting the supporting element on the backing plate for shifting movement as a unit with the friction means in the opposite direction.

12. In a brake mechanism, the combination with a brake drum and a backing plate for said drum, of brake friction means supported on the backing plate in said drum for shifting movement circumferentially of the drum relative to the backing plate and having spaced ends, a bracket having a bore extending axially of the brake drum between the ends of the friction means and having tubular portions extending transversely of the bore at opposite sides of the latter, a wedge mounted in the bore of the bracket for sliding movement axially of said bore, links slidably mounted in the tubular portions with the inner ends engaging the wedge and with the outer ends operatively connected to the brake friction means, and means mounting the bracket on the backing plate for shifting movement as a unit with the friction means.

13. In a brake mechanism, the combination with a brake drum and a backing plate for said drum, of brake friction means supported on the backing plate in said drum for shifting movement circumferentially of the drum relative to the backing plate and having spaced ends, a bracket having a bore extending axially of the brake drum between the ends of the friction means and having tubular portions extending transversely of the bore at opposite sides of the latter, a wedge mounted in the bore of the bracket for sliding movement axially of said bore, links having a sliding fit within the tubular portions and having a bearing engagement with the interior surfaces of the tubular portions throughout the area of said surfaces, said links having the inner ends engageable with the wedge and having the outer ends operatively connected to the spaced ends of the friction means, and means mounting the bracket on the backing plate for movement generally radially and circumferentially of the brake drum relative to the backing plate.

14. In a brake mechanism, the combination with a brake drum and a backing plate for the drum, brake friction means supported on the backing plate within the drum for movement circumferentially of the drum relative to the backing plate and having spaced ends, an adjustment device having an element located between the ends of the friction means in sliding engagement with the inner surface of the backing plate and having a member supported thereby for sliding movement axially of the element to adjust the friction means, and means mounting the element on the backing plate for sliding movement as a unit with the friction means including a part engageable with the outer side of the backing plate and cooperating with the portion of the element slidably engaging the inner side of the backing plate to resist the transfer of torque from one end of the friction means to the other.

EDWARD O. REYNOLDS.